United States Patent
Bedford

[11] Patent Number: 6,086,069
[45] Date of Patent: Jul. 11, 2000

[54] METAL RING SEAL

[75] Inventor: Billy R. Bedford, Peoria, Ill.

[73] Assignee: Caterpillar Inc., Peoria, Ill.

[21] Appl. No.: 08/918,992

[22] Filed: Aug. 27, 1997

[51] Int. Cl.[7] .................................................. F16J 15/38
[52] U.S. Cl. ........................ 277/380; 277/358; 277/371; 277/399; 277/377; 277/379
[58] Field of Search .................................. 277/358, 371, 277/399, 377, 379, 380

[56] References Cited

U.S. PATENT DOCUMENTS

| 2,328,160 | 8/1943 | Marvin ..................................... 277/379 |
| 2,773,367 | 12/1956 | Slaght ................................. 277/380 X |
| 3,194,569 | 7/1965 | Utvitch .................................... 277/380 |
| 3,409,336 | 11/1968 | Dadds ................................. 277/379 X |
| 3,542,377 | 11/1970 | Voitik et al. . |
| 3,767,214 | 10/1973 | Kawamura ............................. 277/358 |
| 3,985,366 | 10/1976 | Plouzek . |
| 4,087,100 | 5/1978 | Yoshihashi et al. .................... 277/399 |
| 4,111,436 | 9/1978 | Yazawa . |
| 4,183,542 | 1/1980 | Quartara .............................. 277/399 X |
| 4,189,159 | 2/1980 | Domes et al. . |
| 4,256,315 | 3/1981 | Larson et al. . |
| 4,396,198 | 8/1983 | Metzner et al. . |
| 4,421,327 | 12/1983 | Morley et al. ...................... 277/399 X |
| 4,489,952 | 12/1984 | Ohtsuka .................................. 277/399 |
| 4,568,090 | 2/1986 | Westemeier . |
| 4,613,005 | 9/1986 | Olsson ................................ 277/399 X |
| 4,821,536 | 4/1989 | Bardsley ............................. 277/399 X |
| 4,844,483 | 7/1989 | Iijima et al. ........................ 277/399 X |
| 5,129,659 | 7/1992 | Ootsuka et al. . |
| 5,527,046 | 6/1996 | Bedford . |

FOREIGN PATENT DOCUMENTS

| 89/02555 | 3/1989 | WIPO .............................. F16J 15/36 |

Primary Examiner—Anthony Knight
Assistant Examiner—Desmond Peyton
Attorney, Agent, or Firm—William B. Heming; Calvin E. Glastetter

[57] ABSTRACT

In a metal to metal face seal assembly, a metal ring seal has a J-shaped cross-section with the hook portion of the ring seal forming an annular notch which receives and restrains a resilient load ring.

6 Claims, 3 Drawing Sheets

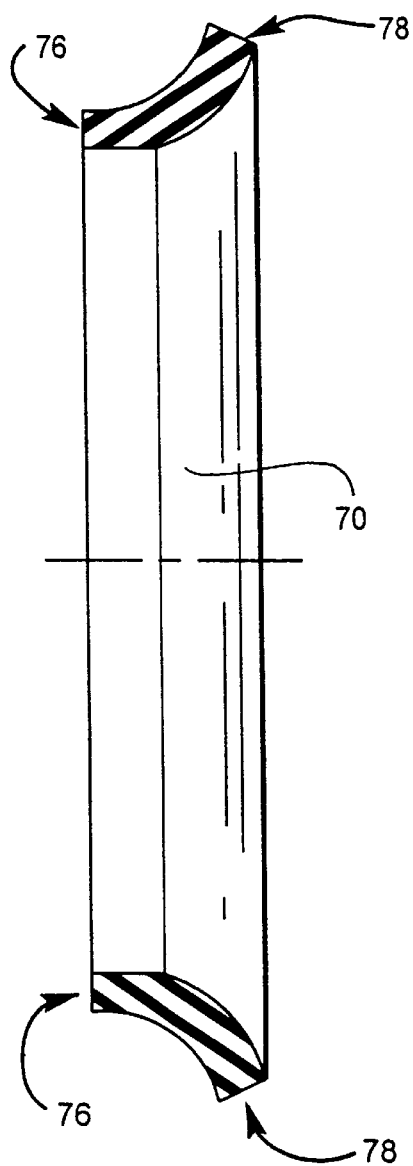
Fig. - 3 -
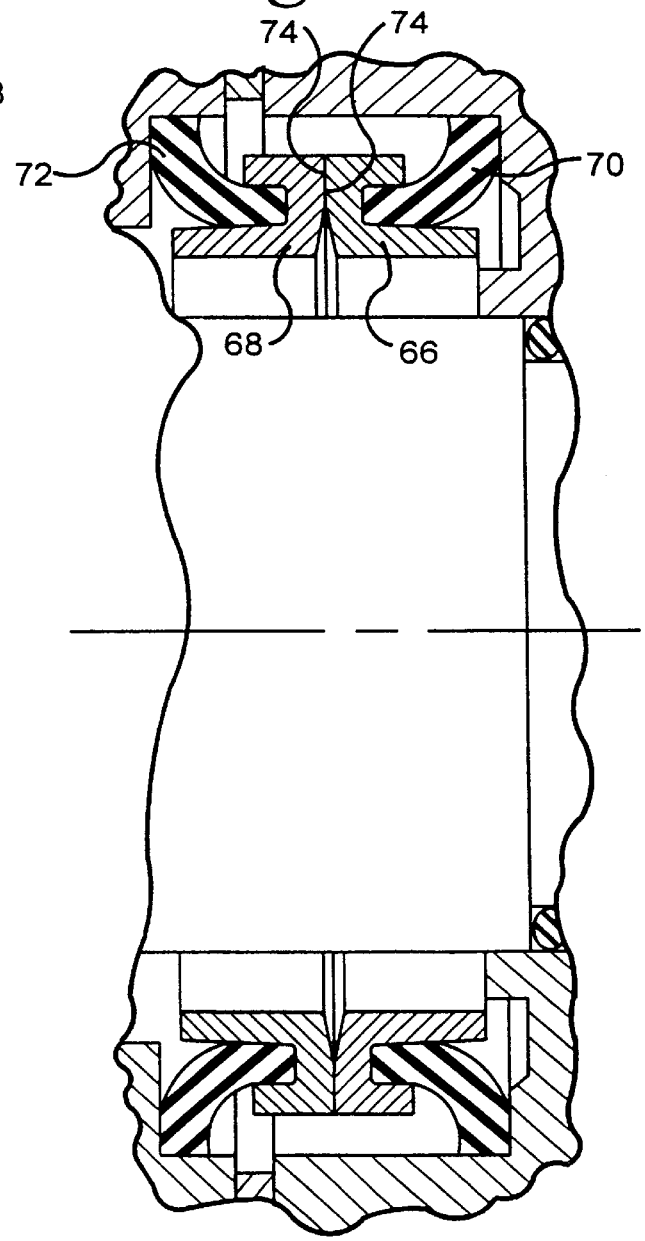
Fig. - 2 -

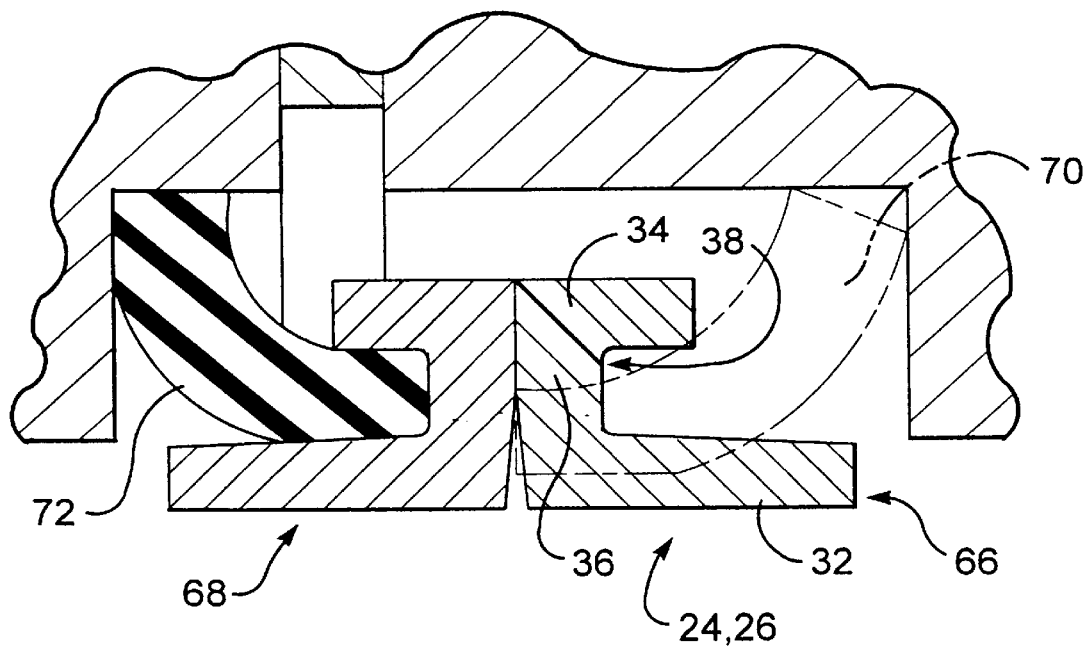
Fig. - 4 -

METAL RING SEAL

TECHNICAL FIELD

This invention relates generally to a metal to metal face seal assembly and more particularly to a metal ring seal shaped for securely retaining a resilient load ring as it applies a force to the seal faces of the metal to metal face seal assembly.

BACKGROUND ART

The present invention has particular application to track rollers, final drives and other components of track-type machines. The problem of short bearing life in track rollers and final drive assemblies of track-type machines is one that has continuously plagued the industry. Such machines typically operate in environments that are highly destructive to seals and consequently to the underlying bearings.

One approach to this problem is the metal to metal seal assembly, such as the assembly described in U.S. Pat. No. 5,527,046 which issued on Jun. 18, 1996 to Billy R. Bedford. This seal assembly uses a resilient load ring for applying a force to the seal faces of a metal to metal face seal and has greatly improved track roller bearing life.

Under certain adverse conditions, such as when ice causes the metal to metal seal faces to temporarily stick, it is possible for the resilient load ring to slip against the back of the metal seal rather than remain stationary, as intended, when the roller or drive rotates. This load ring slippage allows a temporary loss of sealing protection from dirt and abrasives to the internally lubricated bearings.

The present invention is directed to overcoming one or more of the problems set forth above.

DISCLOSURE OF THE INVENTION

In one aspect of the present invention a seal assembly includes first and second metal mating ring seals, each ring seal having a seal face adapted to mate with a seal face of the other ring seal. The seal assembly also has first and second resilient load rings, each load ring being adapted during operation to apply a force to the ring seals at said seal faces.

Each load ring, in a free and uncompressed state, is cup-shaped and columnar in cross-section, and when viewed in cross-section, has first and second end portions. Each metal ring seal has a J-shaped cross-section, with an inner ring portion, an outer ring portion and a radial end portion connecting the inner and outer ring portions. The inner, outer and radial end portions define an annular notch. The notch is of a size and configuration to receive the first end portion of the load ring in order to restrain the first end portion to apply a force at the seal faces during operation.

BRIEF DESCRIPTION OF THE DRAWINGS

FIG. 2 is an enlarged diagrammatic view, partially in section, of a portion of one of the seal assemblies of the present invention;

FIG. 3 is an enlarged diagrammatic sectional view of a load ring of the present invention; and FIG. 4 is a diagrammatic sectional view, on an enlarged scale, of the upper portion of a seal assembly of the present invention as shown in FIG. 2, showing an installed load ring on the left side and an outline view of an uninstalled load ring on the right side.

BEST MODE FOR CARRYING OUT THE INVENTION

Figure 1:
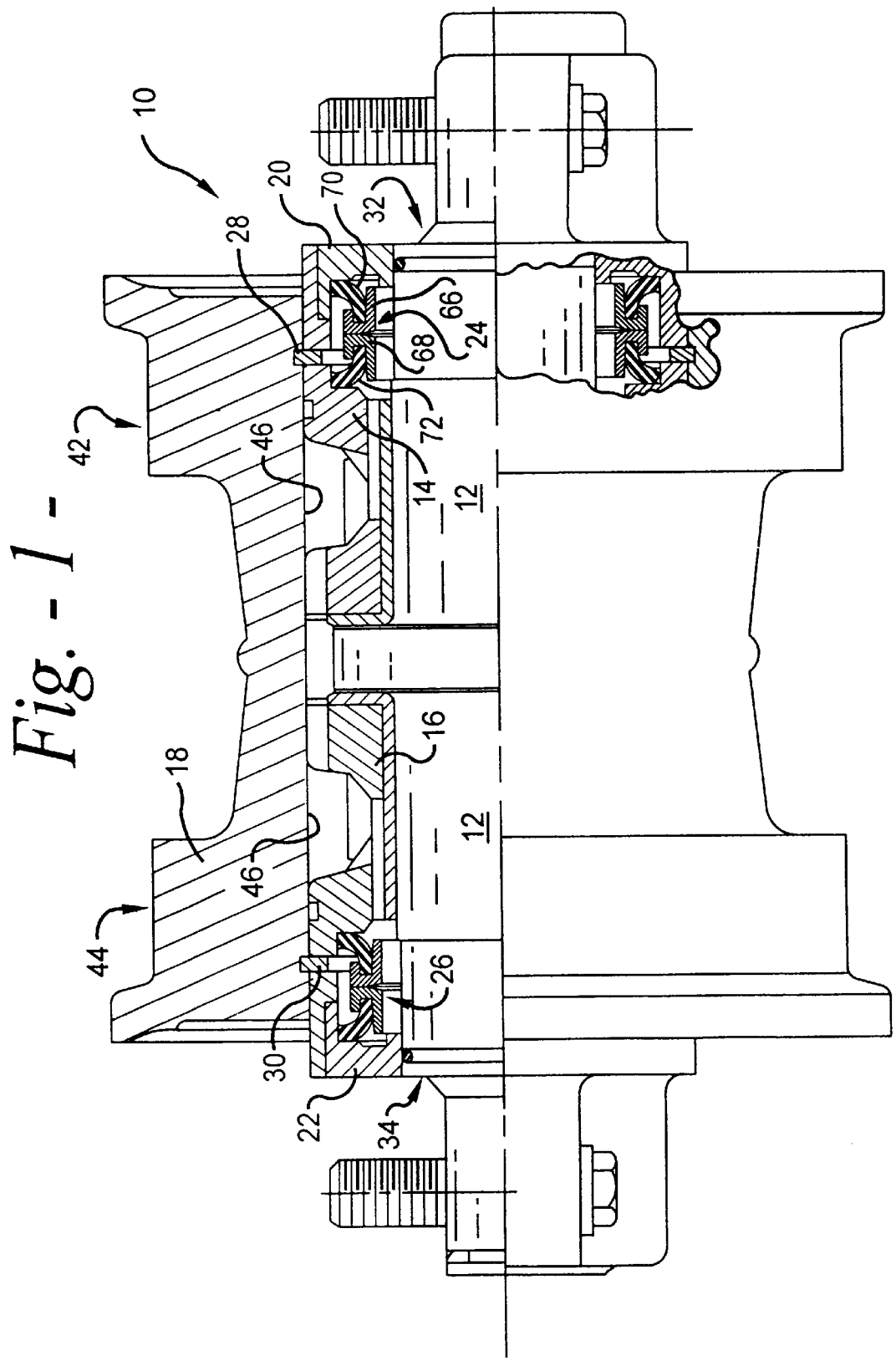
FIG. 1 is a diagrammatic view, partially in section, of a track roller assembly incorporating the subject invention.

With reference to FIG. 1, a track roller assembly 10 for guiding the track (not shown) of a track-type machine (not shown) includes a central supporting shaft 12, first and second bushings 14,16, a roller shell 18, first and second end caps 20,22, first and second seal assemblies 24,26 and first and second split metal retaining rings 28,30 which secure the roller shell 18 in a fixed position with respect to the bushings 14,16 and the shaft 12.

The roller shell 18 has first and second tread portions 42,44 and an internal through bore 46 with the supporting shaft 12 and bushings 14,16 being adapted to fit within the bore 46. The first and second end caps 20,22 are positioned on respective first and second shaft end portions 32,34 and substantially close off each end of the internal bore 46. The first and second seal assemblies 24,26 are positioned between respective first and second bushings 14,16 and first and second end caps 20,22.

The seal assemblies 24,26 prevent leakage of lubricating fluid out of the internal bore 46 and prevent dirt and other foreign material from entering the internal bore 46.

Referring additionally to FIG. 2, each of the seal assemblies 24,26 includes first and second metal ring seals 66,68 and first and second resilient load rings 70,72. The ring seals 66,68 are substantially similar, with each ring seal 66,68 having a seal face 74 which mates with a like seal face 74 on a mating ring seal 66,68 in the assembled condition of the seal assembly 24,26. The ring seals 66,68 have a J-shaped cross-section, with the ring seal J-shape having an inner ring portion 32, an outer ring portion 34 and a radial end portion 36 connecting the inner and outer ring portions (FIG. 4). The facing sides of inner ring portion 32 and outer ring portion 34 are preferably, substantially parallel with each other. The resilient load rings 70,72 are also substantially similar with each other and are adapted when installed to apply a force to the ring seals 66,68 and the seal faces 74. Preferably, the load rings 70,72 have a smaller inner diameter than the outer diameter of inner ring portion 32. The difference in diameters is also preferentially of a magnitude which results in approximately three percent stretch in the inner diameter of the load rings 70,72 when operatively installed on the inner ring portion 32.

Referring to FIGS. 2–4, each of the resilient load rings 70,72 is cup-shaped and columnar in cross-section. The cross-sectional shape of each load ring 70,72 includes first and second end portions 76,78. The inner, outer and radial end portions 32,34,36 of each of the ring seals 66,68 define an annular notch 38, which is sized and configured to easily receive the first end portion 76 of a load ring 70,72 for assembly yet sufficiently narrow to restrain the first end portion 76 in operation. In the assembled condition, the first end portion 76 of each resilient load ring 70,72 is adapted to fit in an annular notch 38 of the ring seals 66,68 and the second end portion 78 of each resilient load ring is adapted to contact one of the bushings 14,16 or one of the end caps 20,22.

Referring to FIG. 4, first seal assembly 24 is shown with the outline of unassembled load ring 70 in cross-section. The outline of load ring 70 illustrates the relative shape of an unloaded load ring 70 prior to assembly, the thickness of first end portion 76 being smaller than the distance between the facing sides of inner ring portion 32 and outer ring portion 34 to accommodate assembly. Referring again to FIGS. 1–3, in the fully assembled condition of the seal assemblies 24,26 the load rings 70,72 are compressed in the cross-sectional columnar direction, which compression translates to a corresponding lateral expansion of the load rings 70,72. This lateral expansion is particularly important at first end portion 76 where the load ring expansion within notch 38 creates a binding action against the inner and outer ring portions 32,34, thereby restraining movement of the load rings 70,72 within notch 38.

INDUSTRIAL APPLICABILITY

With reference to the drawings and the previous detailed description, the subject seal assemblies 24,26 are particularly useful for increasing the life of the roller assembly 10. The metal ring seals 66,68 of the seal assemblies 24,26 prevent dirt from entering the interior of the roller assembly 10 by creating a barrier. The resilient load rings 70,72 of the seal assemblies also contribute to increased wear life of the roller assembly 10 by preventing dirt from entering the interior of the roller assembly 10 by creating a barrier and by pushing the metal ring seals 66,68 together so that they operate properly. The J-shaped cross-section of the metal ring seals 66,68 contributes to the effectiveness of the metal ring seal by restraining the resilient load rings 70,72 from slipping and by ensuring that the load rings and their corresponding metal ring seals rotate together in operation.

Other aspects, objects and advantages of this invention can be obtained from a study of the drawings, the disclosure, and the appended claims.

I claim:

1. In a seal assembly having first and second metal mating ring seals, each ring seal having a seal face adapted to mate with a seal face of the other ring seal and first and second resilient load rings, said load rings being adapted during operation to apply a force to said ring seals at said seal faces, each load ring in a free and uncompressed state being cup-shaped and columnar in cross-section, said cross-sectional shape having first and second end portions, the improvement comprising:

each metal ring seal having a J-shaped cross-section, an inner ring portion, an outer ring portion and a radial end portion connecting the inner and outer ring portions, the inner, outer and radial end portions defining an annular notch, said notch being of a size and configuration to receive the first end portion of said load ring in order to restrain the first end portion and to apply the force at the seal faces during operation.

2. The seal assembly as set forth in claim 1 wherein the inner diameter of the load ring is less than the outer diameter of the inner ring portion.

3. The seal assembly as set forth in claim 1 wherein said inner ring portion and said outer ring portion are substantially parallel to each other along the sides of said inner and outer portions contacting said load ring.

4. The seal assembly as set forth in claim 1 wherein the inner diameter of said load ring has approximately three percent stretch, compared to the free and uncompressed state, in the operatively installed position on said inner ring portion.

5. The seal assembly as set forth in claim 1 wherein the inner and outer ring portions define sides facing said load ring and the distance between said inner and outer sides is greater than the thickness of said first end portion of said load ring in the free and uncompressed state.

6. The seal assembly as set forth in claim 5, wherein the distance between said inner and outer sides is sufficiently narrow when the load ring is in a compressed and loaded state to restrain movement of the load ring.

* * * * *